United States Patent
Wu et al.

(10) Patent No.: US 7,952,969 B2
(45) Date of Patent: May 31, 2011

(54) READ AND WRITE POWER CONTROL METHODS AND SYSTEM FOR OPTICAL RECORDING DEVICE

(75) Inventors: Chih-Chung Wu, Pingtung (TW); Chi-Pei Huang, Miaoli (TW); Ming-Jiou Yu, Taipei (TW)

(73) Assignee: MEDIATEK Inc., Hsin-Chu (TW)

( * ) Notice: Subject to any disclaimer, the term of this patent is extended or adjusted under 35 U.S.C. 154(b) by 0 days.

(21) Appl. No.: 12/762,206

(22) Filed: Apr. 16, 2010

(65) Prior Publication Data

US 2010/0202260 A1 Aug. 12, 2010

Related U.S. Application Data

(62) Division of application No. 11/531,713, filed on Sep. 14, 2006, now Pat. No. 7,729,219.

(51) Int. Cl.
*G11B 7/00* (2006.01)
(52) U.S. Cl. .................................................. 369/47.52
(58) Field of Classification Search ................. None
See application file for complete search history.

(56) References Cited

U.S. PATENT DOCUMENTS

| | | | |
|---|---|---|---|
| 5,617,401 A | 4/1997 | Hurst, Jr. | |
| 5,640,381 A | 6/1997 | Call et al. | |
| 6,552,980 B2 | 4/2003 | Yamazaki | |
| 6,621,780 B2 | 9/2003 | Suzuki | |
| 7,075,882 B2 | 7/2006 | Gyo | |
| 7,263,043 B2 | 8/2007 | Watanabe et al. | |
| 7,286,462 B2 | 10/2007 | Tsai et al. | |
| 7,420,906 B2 | 9/2008 | Yang et al. | |
| 2004/0145978 A1 | 7/2004 | Yamamoto | |
| 2006/0072410 A1 | 4/2006 | Ogawa | |
| 2006/0087952 A1 | 4/2006 | Chiu et al. | |
| 2007/0104060 A1 | 5/2007 | Roh | |

FOREIGN PATENT DOCUMENTS

JP 2003-99935 A 4/2003

*Primary Examiner* — Peter Vincent Agustin

(57) ABSTRACT

The present invention discloses read and write power control methods and system for an optical recording device that records information on an optical disk having read-only areas. The read and write power control methods respectively introduce the steps of determining a specific level of a former power control signal output based on a former power control, and then according to the specific level, setting a predetermined level of a power control signal to induce a present power control for rapidly outputting a proper power of the pick-up head. Accordingly, the level transition of the read/write power control signal can be shortened and even eliminated. An unstable read/write power output for the pick-up head can be avoided.

7 Claims, 5 Drawing Sheets

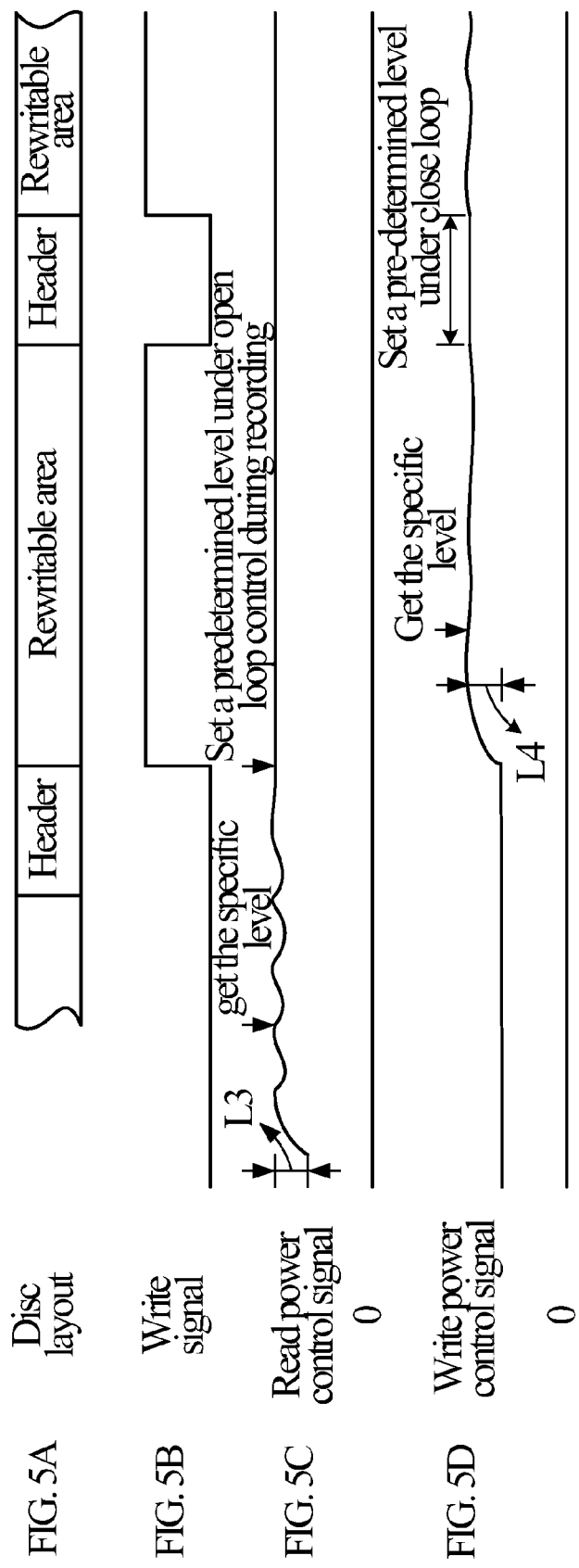

READ AND WRITE POWER CONTROL METHODS AND SYSTEM FOR OPTICAL RECORDING DEVICE

CROSS-REFERENCE TO RELATED APPLICATIONS

This application is a division application of patent application Ser. No. 11/531,713, filed on Sep. 14, 2006 and now issued into U.S. Pat. No. 7,729,219, which claims the benefit of the filing date under 35 U.S.C.§119(e) of a Provisional U.S. Patent Application No. 60/725,090, filed on Oct. 7, 2005, which is incorporated by reference herein.

BACKGROUND OF INVENTION

The present invention relates to read and write power control methods and system of an optical recording device used for recording information on an optical disk that had read-only areas.

Recently, various types of rewritable optical disk such as a DVD-RAM (Digital Versatile Disk Random Access Memory) or DVD-RW disks capable of reproducing digital data therein have come into wide use. In DVD-RAM disks, the stored information is consequently allocated in sector units. Each sector unit includes a read-only identification (ID) area (i.e. a header) and a rewritable area (i.e. user data area), as shown in FIG. 1A. The ID area, i.e. header, is embossed on the optical disk and can be read out with physical information data (PID) which is used to identify the physical location of the sector relative to the optical disk.

Referring to FIGS. 1A & 1B, a pick-up head of an optical recording device applicable for DVD-RAM disk might need to frequently meet multiple headers disposed on the DVD-RAM disk as long as a writing signal is set at logic high to order a write power for a recording operation of the pick-up head. Prior to meet each header, the writing signal has to be set at logic low to temporarily switch the power control from the write power induced by a write power control signal to a read power induced by a read power control signal. This could avoid crushing the PID stored in the respective headers and proceed as the reading operations on the headers, as shown in FIGS. 1C & 1D. However, the pick-up head needs an exact and stable read power to accurately read out the relative PID from the respective headers.

Further referring to FIGS. 1C & 1D, each level transition of a read or write power control signal, under a turn of the power control, for example, from either a write power to a read power, or from a read power to a write power, would result in a unstable power output initially for a while. This is because the read/write power control loop needs a period P1, P2 to settle signal levels from an initial level to approach an optimal level. Especially, if a difference/drop between the initial level and optimal level becomes enlarged because of an operating temperature rise, after each time of beginning of writing operation, the laser power emitted from the pickup head will be always unstable for a while.

However, for the storage optical disk with a header layout, e.g. DVD-RAM, it is a significant topic to achieve a steady power control and a great reading and writing qualities during frequent read/write power switches.

In a case of performing a read power control during a recording operation, shown in FIG. 1C, an operation temperature that may be successively rising would cause in an inexact level difference L1 of the read power control signal output. The read power control signal output has to be adjusted by an Auto Power Control (APC) circuit with compensating the read power control signal to approach the exact level for exactly reading data in the header. However a period of reading the header is too short insufficient to sample an exact power signal into a power control loop to generate a proper power, especially in a high, multiple speed operation.

In another case of performing a write power control during a recording operation, shown in FIG. 1D, the write power control would be frequently interrupted for each time when the pick-up head of the optical recording device passes over respective headers on the optical disk and has to be reactivated thereafter. However, the level transition of a write power control signal under different power control loop (i.e. a close or open loop) may be too long and insufficient to supply the pick-up head with a steady write power. Also, the operation temperature that may be successively rising would cause in an inexact level difference L2 of the write power control signal output. It is apparent that unstable write power is greater proportioned to be involved in writing quality, especially under a high operation temperature.

SUMMARY OF INVENTION

To resolve those drawbacks, it is therefore a primary objective of the present invention to provide read and write power control methods and system for an optical recording device used for recording information on a corresponding optical disk having read-only areas, for example, DVD-RAM.

Secondly, it is an alternative objective of the present invention to provide the read and write power control methods for an optical recording device capable of shortening level transition of the power control signal, even eliminating the level transition, and preventing an unstable power output for the pick-up head.

Thirdly, it is an alternative objective of the present invention to provide the read and write power control methods for an optical recording device capable of rapidly approaching an optimal level of the power control signal to induce proper power needed by the pick-up head.

To achieve the foregoing objectives, the present invention provides a read power control method for an optical recording device having a pick-up head. Before a start of a recording operation of the pick-up head, a specific level of a former read power control signal based on a former read power control (e.g. a close-loop control) is determined After the recording operation, during the pick-up head passes over respective header, a read power is rapidly induced by a predetermined level of the read power control signal which is set under a present read power control (e.g. an open-loop control) according to the specific level, and thereby shortening level transition of the read power control signal. Alternatively, if the present read power control is a close-loop control during the pick-up head passes over respective header, the read power can be rapidly induced by a predetermined level serving as an initial level of the read power control signal, which is set according to the specific level, for gradually approaching an optimal level.

Furthermore, the present invention provides a write power control method for an optical recording device. During a recording operation of the pick-up head, a specific level of a write power control signal based on a former write power control is determined When the pick-up head passes over respective headers, the former write power control is stopped. After the pick-up head passes over respective headers, a write power can be rapidly induced by a predetermined level of a write power control signal which is set under a write power control (i.e. a close or open loop) according to said specific level of the former write power control signal, and thereby shortening level transition of the write power control signal.

Furthermore, the present invention provides a power control system for read and power control of an optical recording device with a pick-up head which includes a microprocessor that decides whether to proceed a recording operation or interrupt a recording operation. An encoder encodes a user data ready to be written in an optical disk and generates a write signal for an auto power controller (APC). The auto power controller receives a feedback signal to detect a laser power emitted from the laser diode and receives the write signal from the encoder to decide a read or write power control. According to a specific level of a former read power control signal based on a former read power control, a read power control signal level determiner determines a predetermined level of a read power control signal output under a present read power control. According to a specific level of a former write power control signal based on a former write power control, a write power control signal level determiner determines a predetermined level of a write power control signal output under a present write power control.

BRIEF DESCRIPTION OF DRAWINGS

FIGS. 5A-5D illustrate several schematic signal diagrams according to the present invention showing an interrelationship among a disk layout (i.e. DVD-RAM) with headers, a write signal, a read power control signal, and a write power control signal.

DETAILED DESCRIPTION

Figure 1:
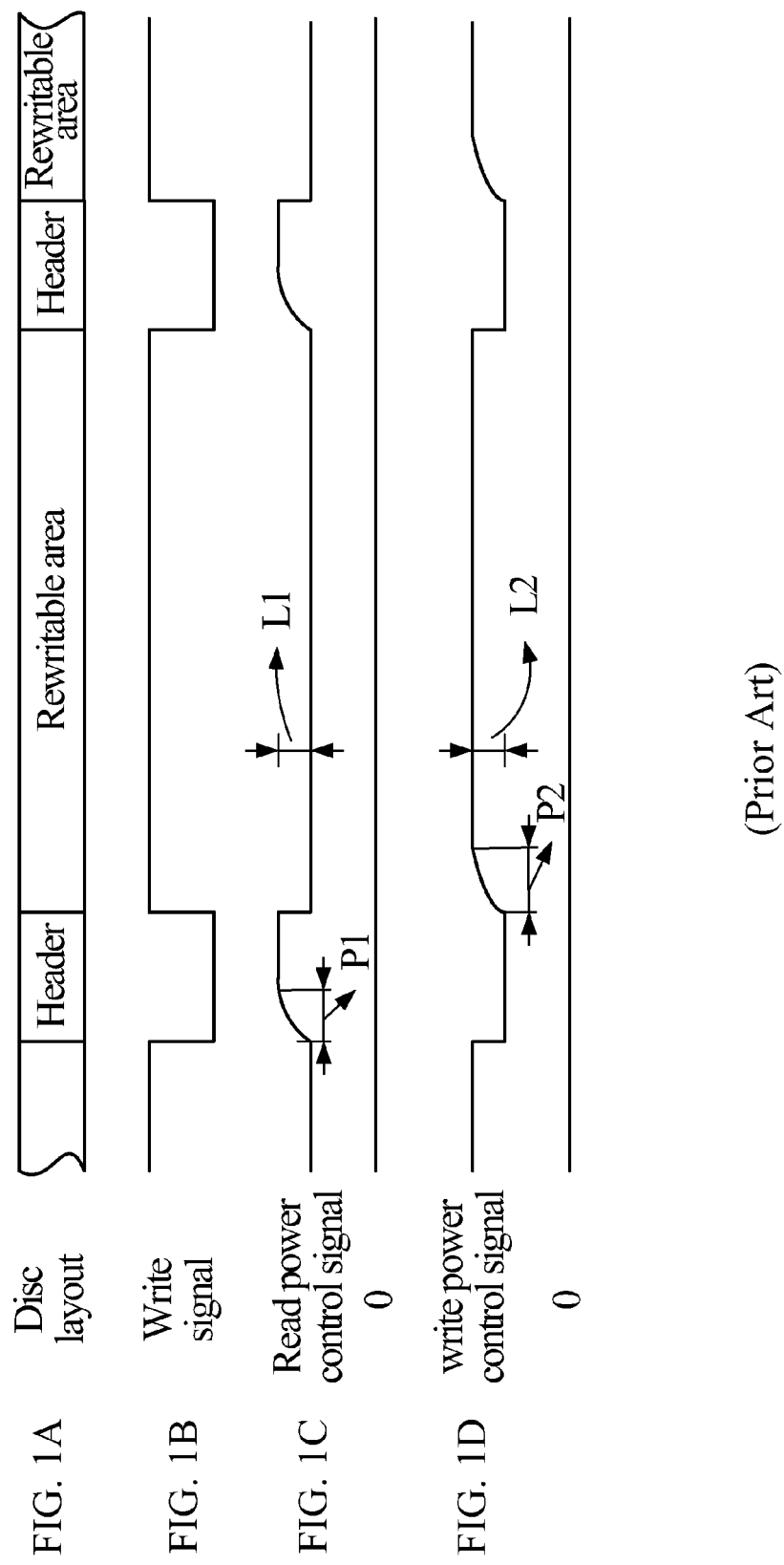
FIG. 1A illustrates a schematic signal diagram according to the related art showing a disk layout.
FIG. 1B illustrates a schematic signal diagram according to the related art showing a write signal.
FIG. 1C illustrates a schematic signal diagram according to the related art showing a read power control signal.
FIG. 1D illustrates a schematic signal diagram according to the related art showing a write power control signal.
Figure 2:
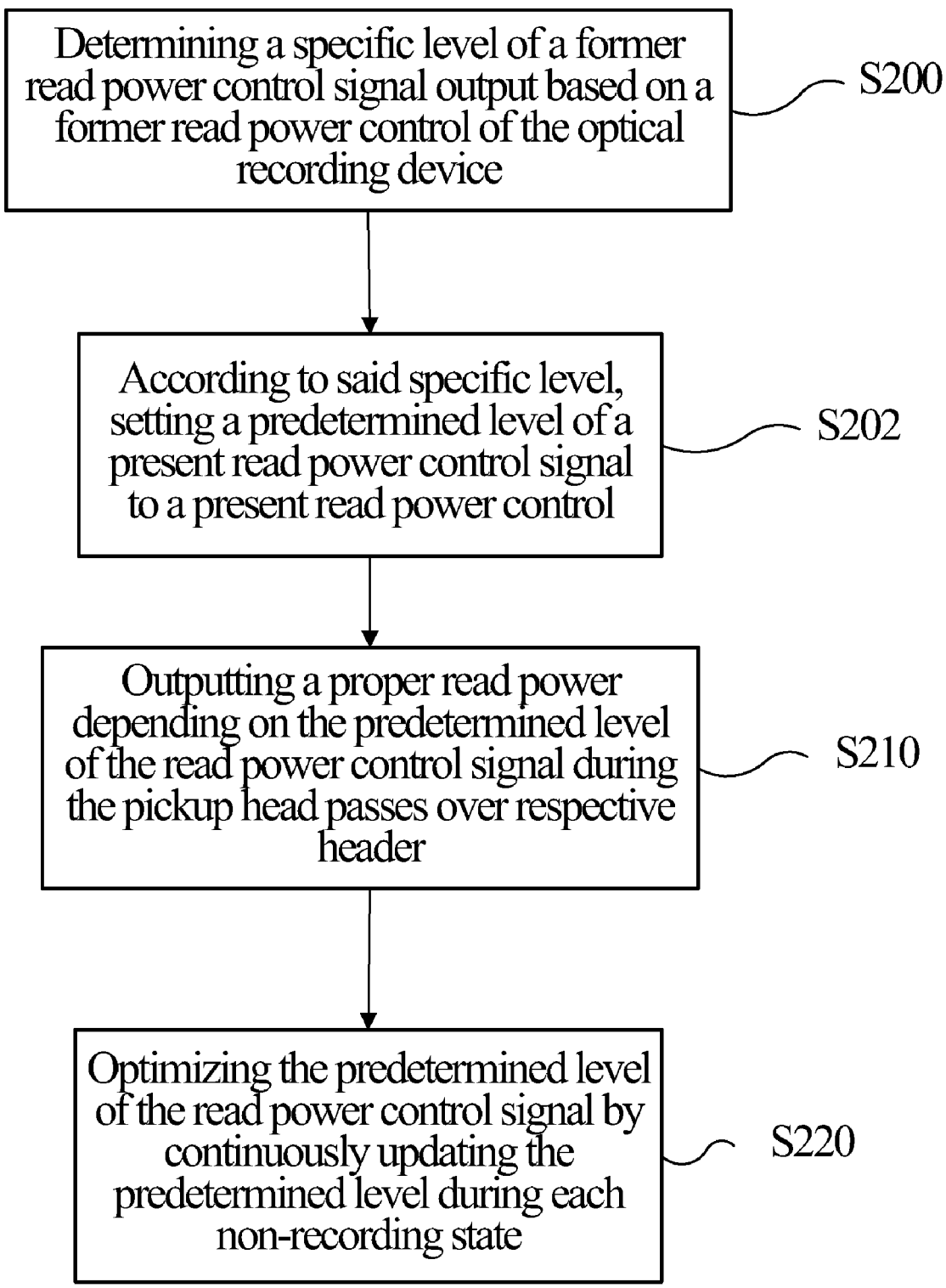
FIG. 2 illustrates a flow chart of a read power control method according to the present invention.
Figure 3:
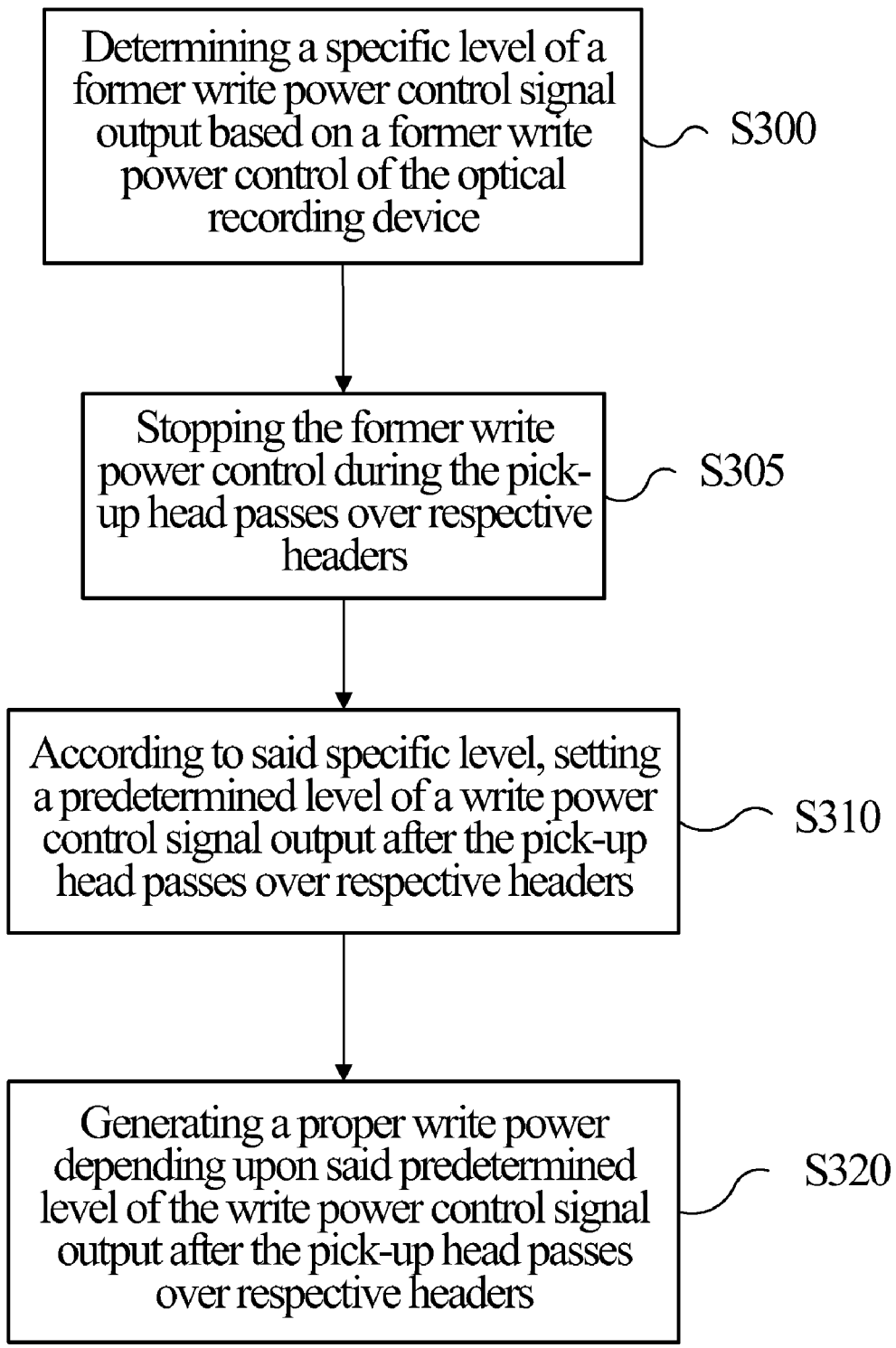
FIG. 3 illustrates a flow chart of a write power control method according to the present invention.

Firstly referring to FIGS. 2, 5A, 5B, and 5C, a read power control method of an optical recording device having a pick-up head for recording information on a corresponding optical disk (e.g. DVD-RAM). The optical disk should be embossed with a plurality of read-only areas interposed between the recordable areas, such as headers in DVD-RAM. According to a preferred embodiment of the present invention, the method comprises the following steps of:

In step S200, determining a specific level of a former read power control signal output based on a former read power control (i.e. a close-loop control) of the optical recording device, which induces a former read power supplied before a recording operation of the pick-up head starts for the corresponding optical disk;

In step S202, according to said specific level, setting a predetermined level of a present read power control signal to a present read power control (i.e. an open loop control). In an exemplar, before recording operation starts, the former read power is generated under a close loop control. But during the pick-up head passes over respective header after the recording operation starts, the present read power is generated under an open loop control. Such a design that the open loop adapts the predetermined level according to the specific level of the former close-loop control is capable of eliminating the level transition of the read power control signal and then preventing an unstable read power output for the pick-up head. In other exemplar, if the former and present read power controls both belong to a close-loop control, the predetermined level is utilized to serve as an initial level of the present read power control signal generated under the close-loop control to gradually approach an optimal level for achieving a shorter settle time of the power control signal.

Meanwhile, the step of determining the specific level of the former read power control signal based on the former read power control further comprises any one of the following steps of:

(1) Using a level of the former read power control signal, which is gradually approached under the former read power control, before the recording operation starts.

(2) Using a level of the former read power control signal, which is sampled under the former read power control, before the recording operation starts.

(3) Averaging a number of levels of the former read power control signal achieved under the former read power control within a specific operation period or a distance formed on the optical disk before the recording operation starts.

(4) Filtering the former read power control signal by a low pass filter (LPF) under the former read power control before the recording operation starts.

(5) Calculating a level of the former read power control signal generated by way of performing any of the aforementioned steps (1), (2), (3) and (4) before the recording operation starts.

(6) Compensating a level of the former read power control signal generated by way of performing any of the aforementioned steps (1), (2), (3), (4) and (5) before the recording operation starts.

In step S210, outputting a proper read power depending on the predetermined level of the present read power control signal achieved from the step S202, under the present write power control, during the pick-up head passes over respective headers after the recording operation starts.

In step S220, optimizing the predetermined level of the read power control signal by continuously updating the predetermined level during each non-recording state. In an exemplar of DVD-RAM, a non-recording state includes a called "writing and verifying" process. Basically, such a verifying process is considered as a reading operation, and therefore the predetermined level of the read power control signal output under the respective read power control (i.e. an open-loop control) can be continuously updated during each verifying process. Also, the non-recording state can include a specific interval for actively interrupting the recording operation to update the predetermined level. Also, the non-recording state can include an interruption of the recording operation in response to rising of the operation temperature of the optical disk in excess of a threshold level. At this moment of the interruption, the predetermined level of the read power control signal output under the read power control can be updated against involvement of the rising temperature in level. Also, the non-recording state can include implement of an external interrupt recording control from the outside of the system, which leads to update the predetermined level of the read power control signal output under the read power control for a stable power supply. For those recordings without verifying process, the non-recording state can include a stop recording period when the pick-up head passes over a boundary between adjacent zones of a DVD-RAM disk, and the predetermined level of the read power control signal output under the read power control can be updated. Also, the non-recording state includes implement of an internal interrupt recording control that will bring the read power control back to a close-loop control for thereafter updating the predetermined level of the read power control signal output under the open-loop control.

Further referring to FIGS. 3, 5A, 5B, and 5D, the present invention provides a write power control method for the optical recording device having a pick-up head for recording information on a corresponding optical disk (e.g. DVD-RAM) with multiple headers allocated thereon. The write power control method comprises the following steps of:

In step S300, determining a specific level of a former write power control signal output based on a former write power control (i.e. a close-loop control) of the optical recording device, which induces a former write power supplied during a recording operation of the pick-up head. In this embodiment of the present invention, the step of determining the specific level of the former write power control signal based on the former write power control further comprises any one of the following steps of:
(1) Using a level of the former write power control signal output which is gradually approached under the former write power control.
(2) Using a level of the former write power control signal output which is sampled under the former write power control.
(3) Averaging a number of levels of the former write power control signal output which are achieved, within either a specific operation period or a distance formed on the optical disk, under the former write power control.
(4) By a low pass filter (LPF) or the like, filtering the former write power control signal output which is achieved under the former write power control.
(5) Calculating the level of the former write power control signal output which is achieved by performing any one of the aforementioned steps (1), (2), (3) and (4) to obtain the specific level under the former write power control.
(6) Compensating the level of the write power control signal output which is achieved by performing any one of the aforementioned steps (1), (2), (3), (4) and (5) to obtain the specific level under the former write power control.

In step S305, stopping the former write power control to switch off the former write power during the pick-up head passes over respective headers;

In step S310, according to said specific level, setting a predetermined level of a write power control signal output to induce a start of a present write power control (i.e. a close-loop control) after the pick-up head passes over respective headers. In one exemplar, if the present write power control belongs to a close-loop control, the predetermined level is utilized to serve as an initial level of this present write power control signal output under the close-loop control so as to gradually approach an optimal level for achieving a more proper write power. In another exemplar, the present write power control can use a close-loop control.

In step S320, generating a proper write power depending upon said predetermined level of the write power control signal output as long as a recording operation starts after the pick-up head passes over respective headers.

Noted is that after the pick-up head passes over respective headers, the proper write power can be rapidly induced by the predetermined level of the write power control signal which is set under the present write power control (i.e. a close or open loop control) according to the specific level previously obtained, thereby shortening level transition of the write power control signal, even eliminating the level transition, and preventing an unstable write power output for the pick-up head.

Figure 4:
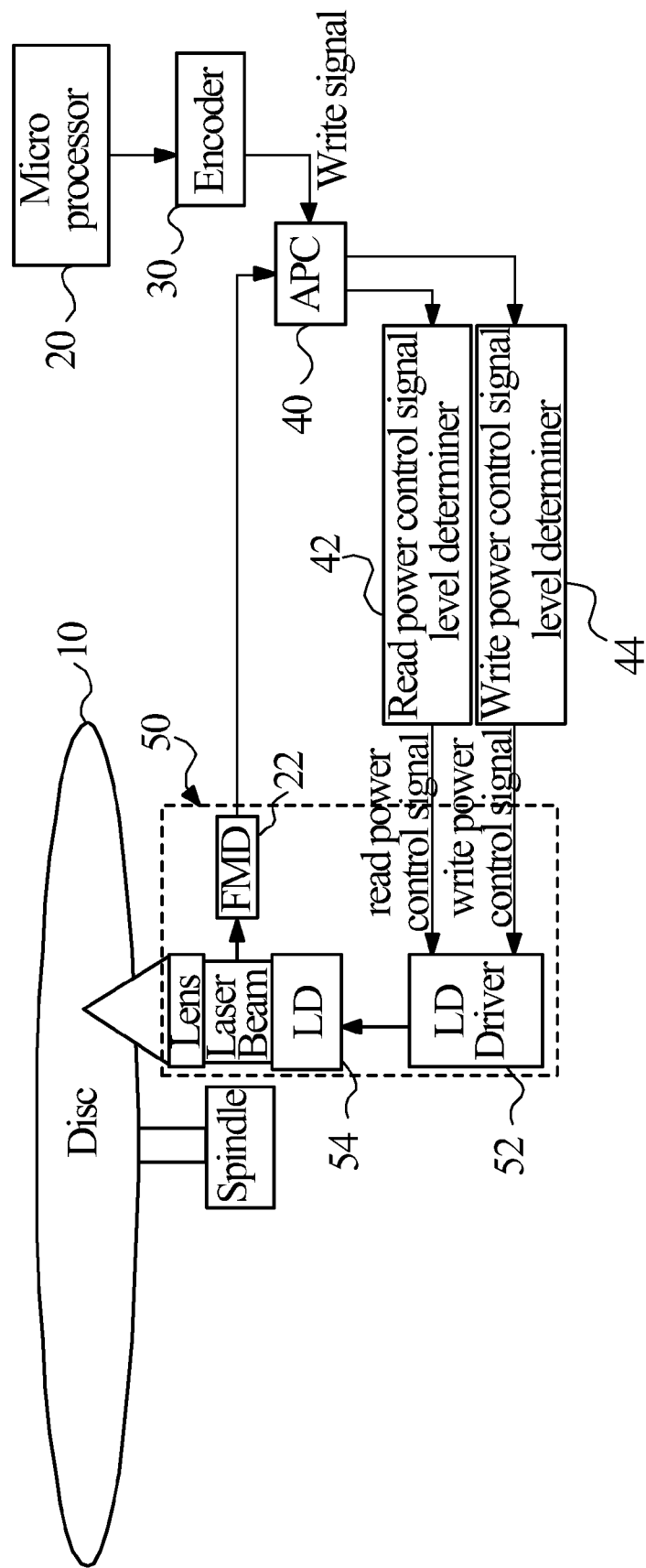
FIG. 4 illustrates a schematic diagram of a power control system according to the present invention.

Further referring to FIG. 4, according to a preferred embodiment of the present invention, a power control system for controlling read and write powers of an optical recording device with a pick-up head 50 for recording information on an optical disk 10 with headers is introduced. The power control system includes a microprocessor 20, an encoder 30, an auto power controller (APC) 40, a read power control signal level determiner 42 and a write power control signal level determiner 44. The microprocessor 20 decides whether to proceed on a recording operation or to interrupt a recording operation for updating a predetermined level of the read power control signal. The encoder 30 is operative to encode user data which is ready to be written in the optical disk 10, depending on a write instruction from the microprocessor 20, and then generate a write signal to the auto power controller (APC) 40. The auto power controller (APC) 40 according to a feedback signal from a front monitor diode (FMD) 22 of the pick-up head 50 to detect a power of a laser beam emitted from a laser diode (LD) 54. The power of the laser beam is controlled with a LD driver 52 of the pick-up head 50 based on the read or write power control signals. The auto power controller (APC) 40, according to the write signal from the encoder 30, decides to switch either a read power control or a write power control as shown in FIG. 5. The auto power controller (APC) 40 utilizes some power controls (i.e. a close loop and/or an open loop control) to respectively output a level of a read/write power control signal for different requirements. The read power control signal level determiner 42 determines a specific level which is achieved based on a former read power control, and then according to specific level, sets either an initial level of a present read power control signal output under the close-loop control for rapidly approaching an optimal level thereafter, or a predetermined level of a present read power control signal output under the open-loop control. The write power control signal level determiner 44 determines a specific level which is achieved based on a former write power control, and then according to the specific level, sets a predetermined level as an initial level of a present write power control signal output under a present write power control (i.e. a close-loop control) for rapidly approaching an optimal level thereafter.

Referring to FIGS. 5A-5D, several schematic signal diagrams according to the preferred embodiment of the present invention show an interrelationship among a disk layout (i.e. DVD-RAM) with disposal of headers, a write signal, a read power control signal, and a write power control signal. Although the rising operation temperature may cause a level difference L3 of the read power control signal output and/or a level difference L4 of the write power control signal output, initially, as shown in FIGS. 5C and 5D. By the specific level f the former read power control signal achieved under the former close-loop control before the recording operation starts, the predetermined level of the present read power control signal output can be rapidly generated under the present open-loop control to induce a proper read power during the pick-up head passes over a header, thereby minimizing involvement of rising operation temperature, and even eliminating the level transition. Alternatively, by the specific level of the former write power control signal approached under the former close-loop control, the predetermined level of the present write power control signal output is set to serve as an initial level for rapidly approaching an optimal level under the present close-loop control to induce a proper write power after the pick-up head passes over a head, thereby minimizing involvement of the rising operation temperature and even eliminating the level transition.

Those skilled in the art will readily observe that numerous modifications and alterations of the device may be made while retaining the teachings of the invention. Accordingly, the above disclosure should be construed as limited only by the metes and bounds of the appended claims.

What is the claimed is:

1. A power control system for a pick-up head that accesses information on an optical disk with a plurality of read-only areas, comprising:
    an auto power controller for deciding a read power control or a write power control;
    a read power control signal level determiner based on the read power control decided by the auto power controller, determining a specific level of a former read power control signal output under a former read power control to set a predetermined level of a present read power control signal to induce a present read power control; and
    a write power control signal level determiner based on the write power control decided by the auto power controller, determining a specific level of a former write power control signal output under a former write power control to set a predetermined level of a present write power control signal to induce a present write power control.

2. The system as claimed in claim 1, wherein the auto power controller further receives a feedback signal from the pick-up head for detecting a laser power emitted from a laser diode.

3. The system as claimed in claim 2, wherein the auto power controller further individually utilizes either a close loop or an open loop to approach the predetermined level of the present read or write power control signal.

4. The system as claimed in claim 1, wherein the read power control signal level determiner determines the specific level of the former read power control signal output under the former read power control to induce a start of the present read power control during the pick-up head passes over the respective read-only areas of the optical disk.

5. The system as claimed in claim 1, wherein the write power control signal level determiner determines the specific level of the former write power control signal output under the former write power control to induce a start of the present write power control during a recording operation of the pick-up head after the pick-up head passes over the respective read-only areas.

6. A power control system for a pick-up head that accesses information on an optical disk with a plurality of read-only areas, comprising:
    an auto power controller; and
    a read power control signal level determiner based on a decision from the auto power controller, determining a specific level of a former read power control signal output under a former read power control to induce a start of a present read power control during the pick-up head passes over the respective read-only areas of the optical disk.

7. A power control system for a pick-up head that accesses information on an optical disk with a plurality of read-only areas, comprising:
    an auto power controller; and
    a write power control signal level determiner based on a decision from the auto power controller, determining a specific level of a former write power control signal output under a former write power control to induce a start of a present write power control during a recording operation of the pick-up head after the pick-up head passes over the respective read-only areas.

* * * * *